United States Patent
Herron et al.

(10) Patent No.: US 7,366,615 B2
(45) Date of Patent: Apr. 29, 2008

(54) METHODS AND APPARATUS USING BOTH NUCLEAR CAPTURE AND INELASTIC SPECTROSCOPY IN DERIVING ELEMENTAL CONCENTRATIONS

(75) Inventors: Susan Herron, Ridgefield, CT (US);
James Grau, Ridgefield, CT (US);
Bradley Roscoe, Ridgefield, CT (US);
Michael Herron, Ridgefield, CT (US);
Kenneth Stephenson, Belmont, MA (US)

(73) Assignee: Schlumber Technology Corporation, Ridgefield, CT (US)

( * ) Notice: Subject to any disclaimer, the term of this patent is extended or adjusted under 35 U.S.C. 154(b) by 0 days.

(21) Appl. No.: 11/496,558

(22) Filed: Jul. 31, 2006

(65) Prior Publication Data
US 2008/0023629 A1 Jan. 31, 2008

(51) Int. Cl.
G06F 19/00 (2006.01)
(52) U.S. Cl. .............................. 702/8; 702/6
(58) Field of Classification Search ............... 250/254, 250/269.4, 269.8; 702/8, 6
See application file for complete search history.

(56) References Cited

U.S. PATENT DOCUMENTS

| 4,686,364 A | 8/1987 | Herron |
| 4,810,876 A | 3/1989 | Wraight et al. |
| 5,097,123 A | 3/1992 | Grau et al. |
| 5,440,118 A | 8/1995 | Roscoe |
| 5,471,057 A | 11/1995 | Herron |
| 7,205,535 B2 | 4/2007 | Madigan et al. |
| 2006/0033023 A1 | 2/2006 | Pemper et al. |

OTHER PUBLICATIONS

Galford, J.E., Hertzog R.C., Galindo, G; "Improving Pulsed Neutron Gamma Ray Spectroscopy Elemental Weight Percent Estimates Through Automatic Dimensioning of the Spectral Fitting Process"; Schlumberger Well Services SPE 18151-MS 1988.*

Grau et al., "A Geological Model for Gamma-ray Spectroscopy Logging Measurements", Nucl. Geophys. Vo. 3, No. 4, pp. 351-359, 1989.

* cited by examiner

Primary Examiner—John Barlow
Assistant Examiner—Douglas N Washburn
(74) Attorney, Agent, or Firm—David Gordon; Jody Lynn DeStefanis; Dale Gaudier

(57) ABSTRACT

Methods and apparatus are provided for determining the content of a first element in a formation which cannot otherwise be determined via a capture spectrum measurement. The methods and apparatus utilize the inelastic spectrum measurement of the first element and the inelastic and capture spectrum measurements of at least a second element. The methods and apparatus have particular application to determining the carbon content of a formation although they are not limited thereto. The inelastic and capture spectrum measurements of silicon are useful in making such determinations, although other chemical elements may be used as the second element.

32 Claims, 4 Drawing Sheets

METHODS AND APPARATUS USING BOTH NUCLEAR CAPTURE AND INELASTIC SPECTROSCOPY IN DERIVING ELEMENTAL CONCENTRATIONS

BACKGROUND OF THE INVENTION

1. Field of the Invention

This invention relates broadly to using spectroscopy in the derivation of elemental concentrations of a sample. More particularly, this invention relates to methods and apparatus for deriving elemental concentrations of a geological formation utilizing both nuclear capture spectroscopy and inelastic spectroscopy.

2. State of the Art

Downhole nuclear spectroscopy measurements provide estimates of the chemical composition of a formation. For chemical composition analysis, nuclear spectroscopy is generally divided into two classes: nuclear spectroscopy inelastic measurements, and nuclear spectroscopy thermal capture measurements. In particular, when a formation is bombarded with high energy neutrons (e.g., 14 MeV), typically from a borehole neutron source, some of the neutrons inelastically scatter off the nuclei of certain atoms in the formation and create gamma rays of characteristic energies. A spectroscopy tool may be used with an early time window to measure the spectrum of (inelastic) gamma ray energies. The spectrum can then be analyzed using a set of pre-defined elemental standard spectra to ascertain the relative contribution of each element. Elements typically included in an inelastic spectrum include carbon (C), oxygen (O), silicon (Si), calcium (Ca), iron (Fe), sulfur (S), and others. The most common application for inelastic spectroscopy data is to use a carbon to oxygen ratio to estimate formation saturation, although the results of inelastic gamma ray measurements have been used in determining formation lithology. See, e.g., U.S. Pat. No. 5,440,118 to Roscoe which is hereby incorporated by reference herein in its entirety.

Similarly, when neutrons from any source, such as a minitron, an AmBe source, or other source, bombard a formation, the neutrons eventually lose energy and at thermal energies may be captured by the nuclei of formation elements which emit gamma rays of energies that are characteristic of the specific element. Again, a spectroscopy tool may be used to detect the gamma rays (in a later time window), and the gamma ray spectrum may be analyzed to ascertain the relative contributions of the contributing elements. Elements typically included in a capture spectrum are silicon (Si), calcium (Ca), iron (Fe), sulfur (S), titanium (Ti), gadonlinium (Gd), hydrogen (H), chlorine (Cl), and sometimes aluminum (Al), sodium (Na), magnesium (Mg), manganese (Mn), nickel (Ni), phosphorus (P) and other elements. The contributions of the elements to the gamma ray spectrum may then be used to estimate elemental concentrations through a geological model, sometimes referred to as "oxides closure". See, Grau et al., 1989 "A Geological Model for Gamma-ray Spectroscopy Logging Measurements", *Nucl. Geophysics, Vol. 3, No. 4, pp. 351-359* and co-owned U.S. Pat. No. 4,810,876 to Wraight et al. which is hereby incorporated by reference herein in its entirety.

Briefly stated, oxides closure utilizes capture spectroscopy data along with independent measurements of aluminum (Al) and potassium (K). The model assumes that the formation elements detected by the capture spectroscopy measurements can be quantitatively linked to their oxides or most common form in the formation and that the sum of all the oxides will sum to unity. The model takes the form of:

$$X_K W_K + X_{Al} W_{Al} + F\left\{\sum_i X_i(Y_i/S_i)\right\} = 1 \qquad (1)$$

where X is the factor that converts an element i to its oxide or most common association (e.g., Ca can be converted to $CaCO_3$), W is the weight fraction of the element in the formation, Y is the fraction of the measured gamma-ray spectrum attributed to the specific element, S is a predetermined measurement sensitivity that depends on the capture cross section of the specific element and the measurement tool, and F is a fraction value often called the conversion factor or closure factor. After solving for F, the weight fraction of each element may be computed according to $$W_i = F(Y_i/S_i) \qquad (2)$$

A second closure model was developed for use in cases where only capture spectroscopy data are available. The second closure model, as described in detail in co-owned U.S. Pat. No. 5,471,057 to Herron which is hereby incorporated by reference herein in its entirety, is identical to the oxides model except that it eliminates the aluminum and potassium terms, and it modifies the X association factors to account for the lack of aluminum and potassium measurements. The second closure model is described according to $$F\left\{\sum_i X_i(Y_i/S_i)\right\} = 1 \qquad (3)$$

While the closure models provide relatively good results, it will be appreciated that inaccuracies arise due to the assumptions in the model regarding the elemental associations in the formation. For example, calcium could reside in a calcium silicate instead of a calcium carbonate. This particular uncertainty could be eliminated with an independent measure of carbon. Because capture spectroscopy cannot identify carbon, the inorganic carbon content of the formation is assumed to be associated with the calcium content and the traditional closure models ignore organic carbon.

SUMMARY OF THE INVENTION

It is therefore an object of the invention to provide methods and apparatus for deriving elemental concentrations of a geological formation utilizing both nuclear capture spectroscopy and inelastic spectroscopy.

It is another object of the invention to provide methods for combining yields from inelastic spectrum measurements with yields from capture spectrum measurements into a single closure model.

It is a further object of the invention to provide methods and apparatus for computing total carbon content of locations along a borehole utilizing both nuclear capture spectroscopy and inelastic spectroscopy.

It is also an object of the invention to provide methods and apparatus for determining the organic carbon content of a formation through the utilization of inelastic and capture spectrum measurements.

In accord with these objects, which will be discussed in detail below, according to a first embodiment of the invention, a (pseudo-)capture yield of an element E which for which a capture spectrum is not otherwise available is calculated by taking the inelastic yield of the element and multiplying the inelastic yield by the modified ratio of the capture and inelastic yields of an element Z for which both inelastic and capture spectra are available, with the ratio being modified by adjusting for measurement sensitivities. The pseudo-capture yield is then assigned an association factor and incorporated in a closure model in order to provide a weight fraction for the element.

It will be appreciated that the invention has particular application to a determination of carbon concentrations which, to date, have only entered closure models indirectly through calcium content, as a capture yield for carbon is not reliable. In the case of carbon, it might be associated with $CO_2$ or $CO_3$ or one or more organic compounds for inclusion in a closure model. The invention also has particular application to a determination of magnesium concentrations which are sometimes available from either capture or inelastic measurements or both, but often with poor precision. It will also be appreciated that silicon, calcium, sulfur, or any element common to both measured spectra may be used as the element (Z) for which a modified ratio of yields is taken, as both the inelastic and capture spectra are available for both silicon, calcium, and sulfur.

Using the first embodiment of the invention, it is then possible to compute the amount of organic carbon in the formation by finding the weight fraction of (total) carbon via the pseudo-capture yield and closure model, computing the inorganic carbon from the calcium and/or magnesium determinations, and estimating organic carbon as the difference between the total carbon and the inorganic carbon. In the case of high organic carbon content, the original estimate of carbon will be low if the association factor assumed carbon to reside as $CO_2$ or $CO_3$. Thus, according to one aspect of the invention, an iterative technique can be utilized by assigning a new association factor and repeating the determinations until convergence is found.

According to a second embodiment of the invention, the capture closure model according to equation (3) above is used to compute elemental concentrations (weight fractions). The elemental concentration of an element E analyzed in the inelastic spectrum but not in the closure model spectrum is then computed by multiplying the ratio of the inelastic and capture yields of E by the weight percentage of an element Z for which both inelastic and capture spectra are available, with the ratio being modified by adjusting for measurement sensitivities.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
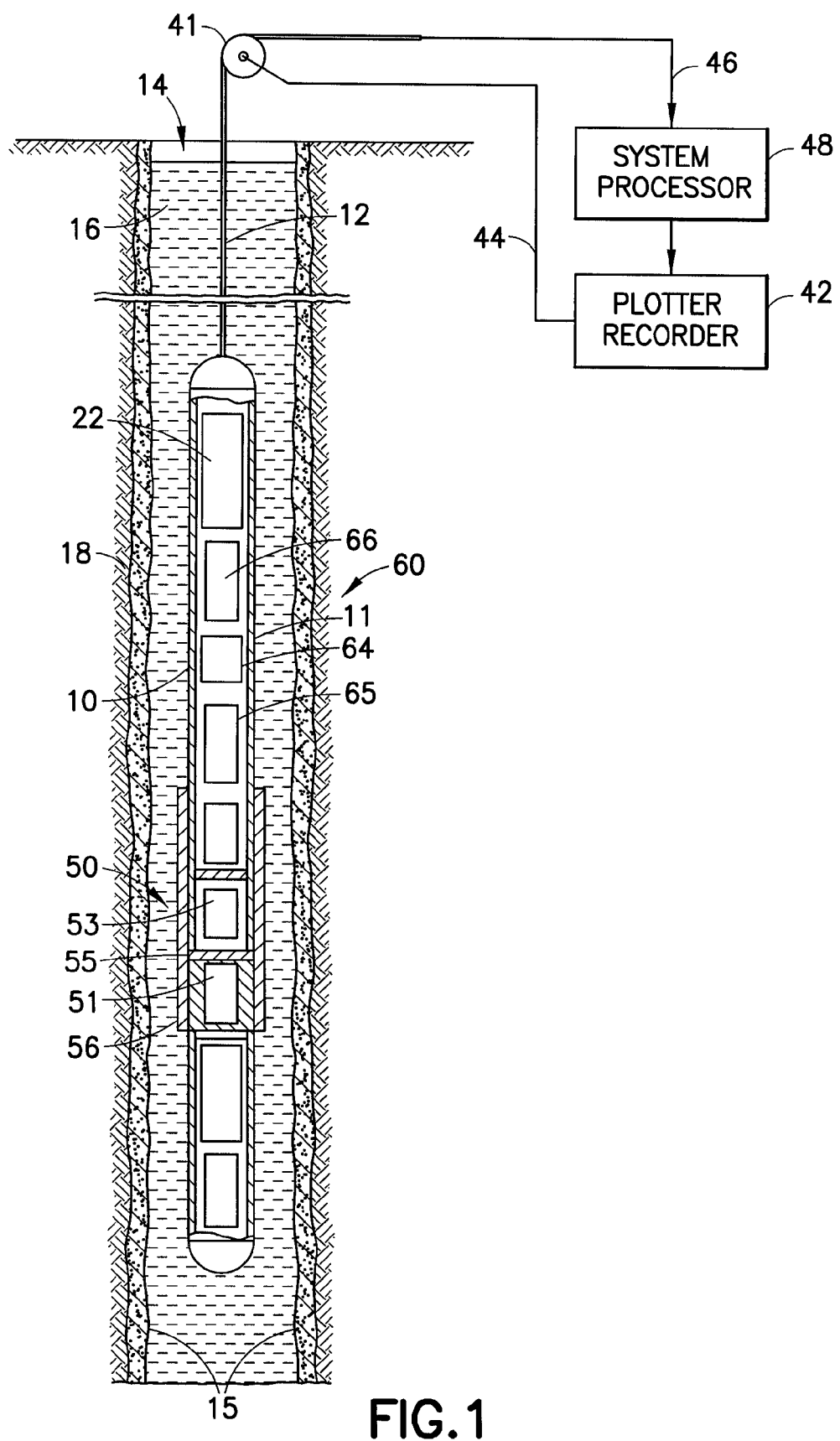
FIG. 1 is a schematic diagram of a tool in a borehole which may be used to carry out the invention.

Turning now to FIG. 1, an illustrative embodiment of the apparatus embodying the overall method of the present invention is shown in the form of a logging tool string 10 suspended by an armored cable 12 in the borehole 14. The borehole is typically filled with drilling mud 16 and is surrounded by an earth formation 18. During drilling, the drilling mud deposits a layer of material on the borehole wall in the form of a mud cake 15.

The tool string 10 generally comprises an elongated housing 11 including, at the top, a communication cartridge 22 and a plurality of tool systems designed to acquire data for the determination of the absolute or relative concentrations of a plurality of elements in the formation 18.

It should be understood that reference herein to tools, detectors, tool systems, and the like are not to be construed as defining limitations on whether a particular function is to be performed by a single device or a plurality of devices, or whether such devices are contained within a single tool, or a plurality of tools drawn through the borehole 14 in tandem. For convenience, the term "tool system" as used herein, shall refer to one or more individual devices that acquire and process data from the formation or borehole (whether open hole, cased hole or otherwise), regardless of the manner of conveyance therethrough, for use in determining a specific property or quantity of interest.

While the tool string 10 is moved through the borehole 14, an indication of its depth in the borehole is provided by a depth determining apparatus, such as one generally indicated at 41, which is responsive to movement of the cable 12 as it is let out and reeled in by a winch (not shown). The depth determining apparatus 41 is connected to a plotter/recorder 42 by a conventional, well-known cable-following device 44. Again, it should be noted that the tool system of the invention need not be a "wireline" system and may include logging or measurement while drilling (LWD or MWD) tools or tools deployed in a borehole by other methods.

The data gathered by the different tool systems in the string 10 are initially processed in the communication cartridge 22 and are preferably transmitted through the cable 12, by means of communication line 46 into the system processor 48, although pulsed telemetry is typically used in LWD and MWD tools, and other communication mechanisms can be utilized. Alternatively, data may be stored downhole and provided to the system processor 48 on trips out of the formation. The system processor 48 is typically located above ground and operates in real time, although processing may occur downhole if desired. The function of the system processor 48 is to determine the elemental concentrations in the formation and store values. The system processor 48 may be implemented using one or more of a computer, dedicated hardware, data storage elements, software, or other well-known elements. A plot or recording of the elemental concentrations at various depths within the borehole can be made at 42.

The tool string 10 includes a plurality of tool systems preferably successively arranged along the string 10. While many different tool systems may be utilized, in accord with the invention, the tool string 10 of the invention includes at least a tool system capable of measuring both the inelastic and the capture spectra of the earth formation adjacent the borehole. The tool system may take the form of a single source-detector arrangement on a single tool, or one or more sources and one or more detectors on one or more tools. As seen in FIG. 1, the tool string 10 depicted is provided with an inelastic spectrum measurement system 50 such as disclosed in U.S. Pat. No. 5,440,118 to Roscoe which is hereby incorporated by reference herein in its entirety which is shown below the communication cartridge 22. The inelastic spectrum measurement system 50 typically includes a pulsed neutron accelerator 51 (e.g., a Minitron) and at least one gamma ray detector 53, with high-density shielding 55 interposed there-between. The pulsed neutron accelerator is preferably capable of generating relatively high energy neutrons (e.g., 14 MeV). The system 50 may be surrounded by a boron carbide impregnated sleeve 56 in the region of the accelerator and the detector to minimize the detection of capture gamma rays originating from neutron interactions in the string 10 and the borehole fluid 16.

Tool string 10 is also provided with a capture spectrum system 60 which is shown between the inelastic spectrum measurement system 50 and the communication cartridge 22. The capture spectrum system 60 typically includes a broad energy spectra neutron source 64 disposed between first and second gamma ray detectors 65, 66 such as disclosed in U.S. Pat. No. 5,097,123 to Grau et al. which is hereby incorporated by reference herein in its entirety. The broad energy spectra neutron source is typically an AmBe source which outputs neutrons in the broad energy range of 2 to 10 MeV, although other sources can be utilized. The capture spectrum system 60 may be embodied in an ECS tool, an EcoScope tool, or an RST tool (ECS, EcoScope and RST being trademarks of Schlumberger Technology Corporation), although other capture spectrum tools may be utilized.

Other tool systems may be provided in addition to the inelastic spectrum measurement system 50 and the capture spectrum system 60 as desired. These additional tool systems may include systems such as: an NGS tool or HNGS tool which measure natural gamma radiation of a plurality of elements in the formation such as potassium, uranium, and thorium; an aluminum activation tool such as the AACT tool which measures the absolute aluminum concentration in the formation, etc. (NGS, HNGS, and AACT being trademarks of Schlumberger Technology Corporation).

Using the gamma ray detector of the inelastic spectrum measurement system 50, the systems processor 48 can determine the contribution of various elements such as C, O, Si, Ca, Fe, Mg, and S to the measured spectrum. Similarly, using the gamma ray detectors of the capture spectrum system 60, the systems processor 48 can determine the contribution of elements such as Si, Ca, Fe, S, Ti, Gd, H, Cl, and others (e.g., Al, Na, Mg, Mn, Ni, P, Cu, Ba, and other elements).

Figure 2:
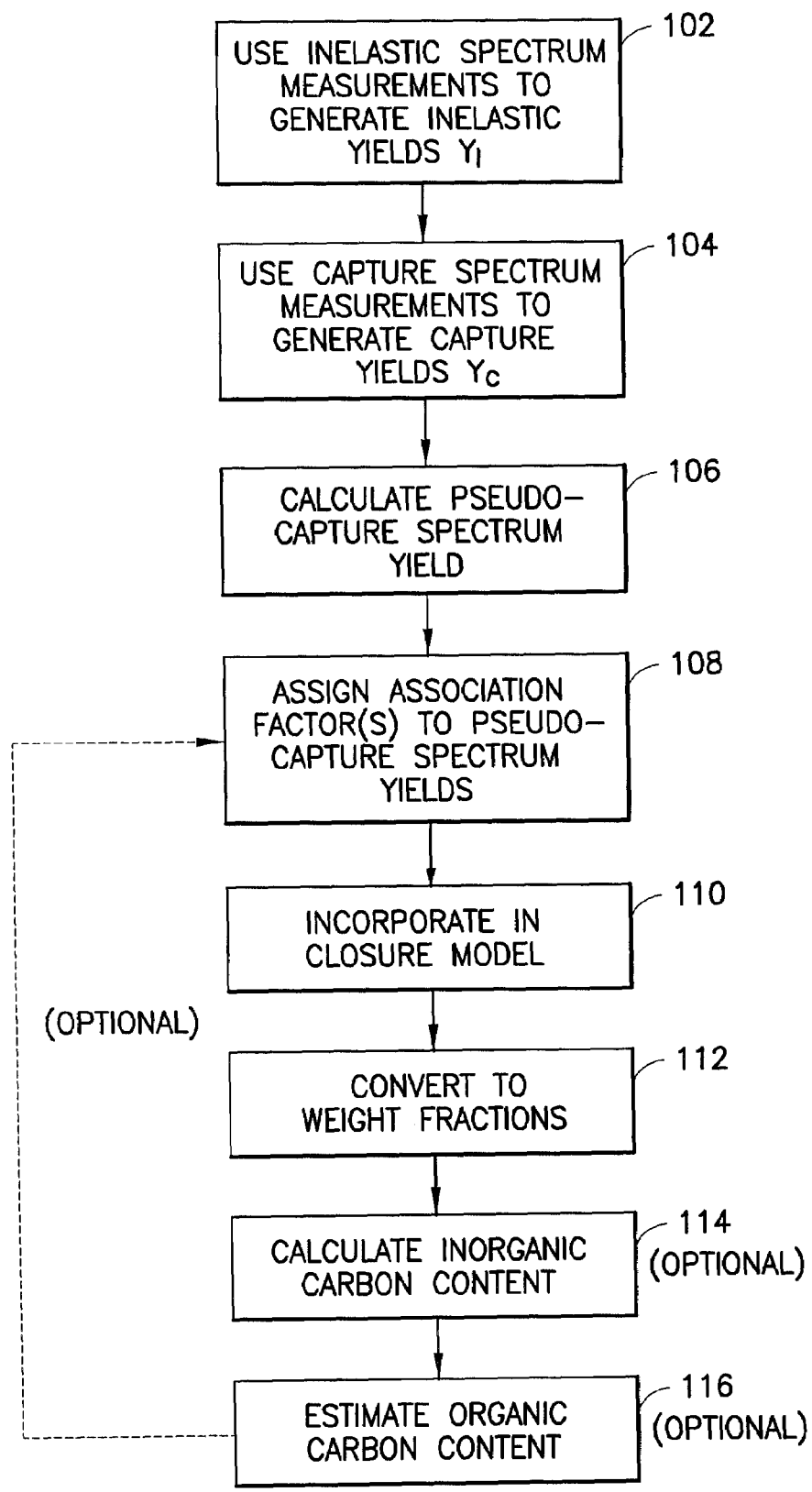
FIG. 2 is a flow diagram of a method according to a first embodiment of the invention.

Turning now to FIG. 2, a flow chart of the processing conducted by the systems processor 24 according to a first embodiment of the invention is seen. At 102, the inelastic spectrum measurement results are utilized in manners well known in the art to generate a plurality of inelastic elemental yields $Y_I$. The plurality of yields includes at least a first yield for an element for which a pseudo-capture spectrum yield is desired (e.g., carbon), and a second yield for an element (e.g., silicon) whose capture spectrum yield is also measured. Other elemental yields may also be determined at 102 utilizing the inelastic spectrum measurement results. At 104, the capture spectrum measurement results are utilized in manners well known in the art to generate a plurality of capture elemental yields $Y_C$. The plurality of capture elemental yields include at least the yield for the element whose inelastic spectrum yield was determined at 102, and preferably all yields necessary to generate a closure model such as disclosed above with reference to equations (1)-(3).

Then, at 106, the pseudo-capture spectrum yield is calculated according to:

$$Y_{CE}/S_{CE} = (Y_{IE}/S_{IE}) \times (S_{IZ}/Y_{IZ}) \times (Y_{CZ}/S_{CZ}) \quad (4)$$

where Y is a yield, S is a sensitivity, the first subscript I or C denotes inelastic or capture values respectively, and the second subscript E or Z denotes an element for which a pseudo-capture determination is desired (e.g., carbon) and an element for which both inelastic and capture determinations are available (e.g., silicon) respectively. Since the sensitivities S of the measurements are known (other than $S_{CE}$ which is a normalized sensitivity set to 1), and the yields Y for the all but the capture value for element E are known, the (pseudo-)capture yield for E determined at 106. It will be appreciated that according to equation (4), the pseudo-capture yield for element E (e.g., carbon) $Y_{CE}$ is obtained by multiplying the inelastic yield of element E ($Y_{IE}$) by the modified ratio of the capture and inelastic yields of element Z (e.g., silicon) (i.e., $Y_{CZ}/Y_{IZ}$), with the ratio being modified by adjusting for measurement sensitivities ($S_{IZ}$)/($S_{IE} \times S_{CZ}$).

While the pseudo-capture yield for carbon is highly desirable, it will be appreciated that the pseudo-capture yield for other elements such as magnesium may likewise be desired. If it is desired to obtain pseudo-capture yields for other elements, that may be done as well. In addition, for any given element for which a pseudo-capture yield is desired, it is possible to use equation (4) separately with respect to more than one element whose inelastic and capture yields are found (e.g., silicon, calcium, sulfur). The results may then be averaged or otherwise combined.

Once the (pseudo-)capture yield(s) for the desired element(s) is/are determined, at 108, according to one aspect of the invention, the yield(s) is/are assigned one or more association factors. Thus, for example, carbon may be associated with $CO_2$ or $CO_3$. Then, at 110, the associated yields may be incorporated in a closure model in the form of equation (1) or equation (3), or otherwise. Carbon and/or other elements represented in the closure may be converted to weight fractions at 112 using equation (2).

According to another aspect of the invention, in the case of organic rich sediments, it is possible to estimate the amount of organic carbon in the formation. More particularly, at 114, the amount of inorganic carbon is calculated from the determinations of Ca and/or Mg obtained from the inelastic and capture spectra, and at 116, the organic carbon is estimated as the difference between the total carbon calculated at 112 and the amount of inorganic carbon calculated at 114. In the case of a high organic carbon content, the original estimate of carbon will be low if the associations conducted at 108 are chosen as $CO_2$ or $CO_3$ instead of organic molecule associations. Thus, according to this aspect of the invention, an iterative loop may be set up, whereby at 108, additional or different association factors are chosen, and steps 110-116 (including changing the closure model) are repeated at least once, and possibly several times, until the associations utilizing organic carbons correspond with the calculated amount of organic carbon at 116 within a predetermined range.

Alternatively, at 108, instead of associating carbon with only $CO_2$ or $CO_3$, the carbon may be additionally associated with organic carbon compounds (e.g., $CH_2$). Then, at 110, the associated yields may be incorporated in a closure model and converted to weight fractions at 112. As understood by one skilled in the art, the closure model utilized in step 110 may be modified as required. As used herein, the term "closure model" shall included "modified closure models". Using such an arrangement, organic carbon content may be determined.

As yet another alternative, where it is known that the investigated formation, or a portion thereof, includes only organic carbon (e.g. shales) and no inorganic carbon (calcium carbonate), at 108 all of the carbon can be associated with one or more organic compounds. Then, at 110, the associated yields may be incorporated in a closure model and converted to weight fractions at 112. Again, this provides one embodiment by which organic carbon content may be determined.

Figure 3:
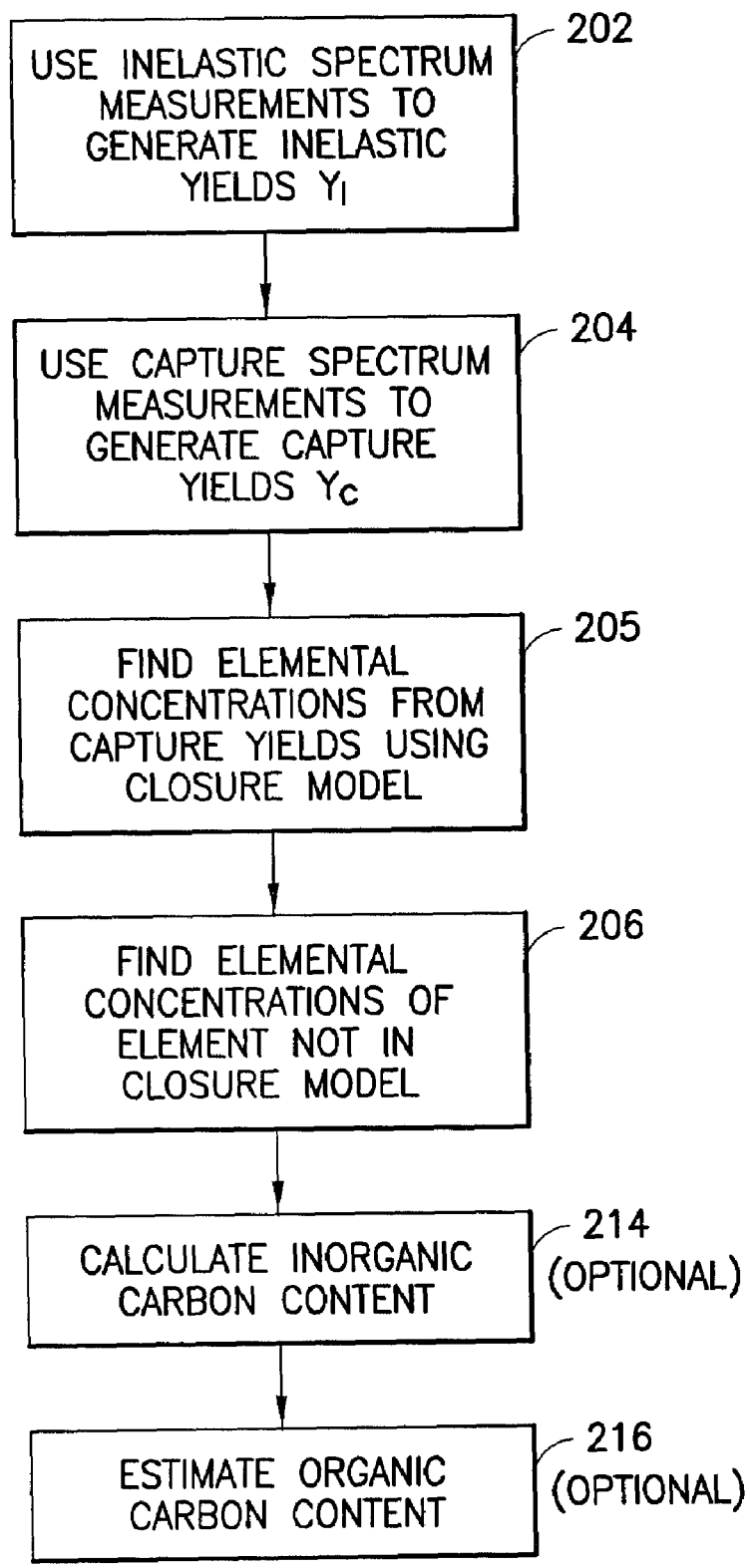
FIG. 3 is a flow diagram of a method according to a second embodiment of the invention.

A second embodiment of the invention is seen in FIG. 3. According to the second embodiment, the elemental concentration of an element for which a capture spectrum is not available may be found by first using the capture closure model described above in equation (3) in order to find the elemental concentration of an element for which both the inelastic and capture spectra are available, and then by using that elemental concentration with a modified ratio of the inelastic yields of the two elements in order to find desired quantity. In particular, at 202, the inelastic spectrum measurement results are utilized in manners well known in the art to generate a plurality of inelastic elemental yields $Y_I$. The plurality of yields includes at least a first yield for an element (e.g., carbon) for which an elemental concentration is desired, and a second yield for an element (e.g., silicon) whose capture spectrum yield is also measured. Other elemental yields may also be determined at 202 utilizing the inelastic spectrum measurement results. At 204, the capture spectrum measurement results are utilized in manners well known in the art to generate a plurality of capture elemental yields $Y_C$. The plurality of capture elemental yields include at least the yield for the element whose inelastic spectrum yield was determined at 202, and preferably all yields necessary to generate a closure model such as disclosed above with reference to equations (1)-(3). Then, at 205, using the desired closure model, the elemental concentrations of the various elements are found. With the elemental concentrations from the closure model, the elemental concentration of an element (e.g., carbon) which was not measured in the capture spectrum can be calculated at 206 according to $$W_E = W_Z(Y_{IE}/S_{IE}) \times (S_{IZ}/Y_{IZ}) \quad (5)$$

where W is an elemental concentration, Y is a yield, S is a sensitivity, the subscript I denotes inelastic values, and the subscript E or Z denotes an element for which a pseudo-capture determination is desired (e.g., carbon) and an element for which both inelastic and capture determinations are available (e.g., silicon) respectively.

According to another aspect of the invention, in the case of organic rich sediments, it is possible to estimate the amount of organic carbon in the formation. More particularly, at 214, the amount of inorganic carbon is calculated from the determinations of Ca and/or Mg obtained from the inelastic and capture spectra in manners known in the art, and at 216, the organic carbon is estimated as the difference between the total carbon calculated at 206 and the amount of inorganic carbon calculated at 214.

Figure 4:
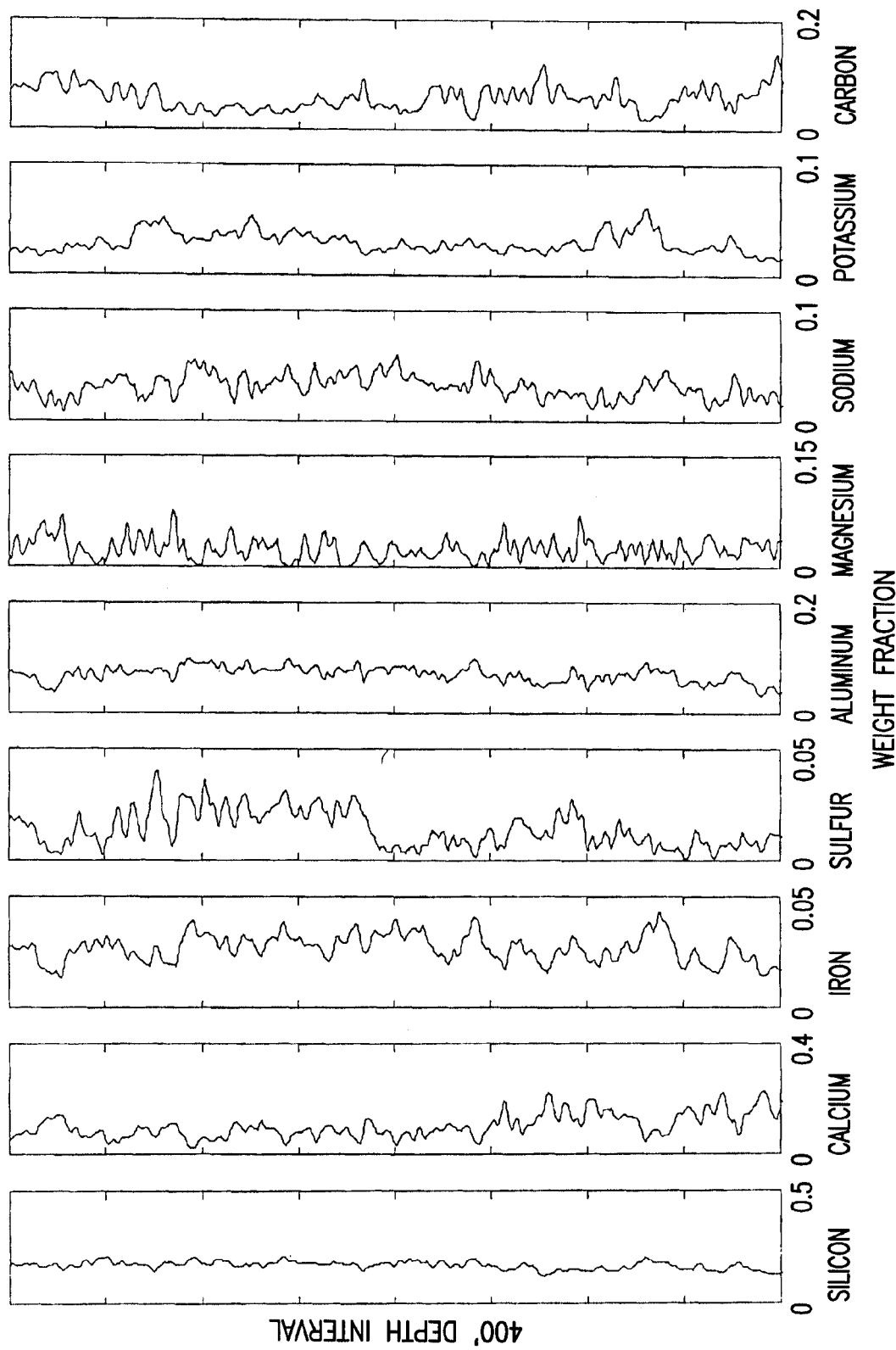
FIG. 4 is a sample log obtained utilizing the apparatus and methods of the invention.

As will be appreciated by those skilled in the art, various quantities calculated by the methods and apparatus of the invention may be displayed in various forms such as a log over a borehole depth. Those quantities could include one or more pseudo-capture yields, one or more weight fractions, total carbon content, organic carbon content, inorganic carbon content, etc. A sample log showing weight fractions of silicon, calcium, iron, sulfur, aluminum, magnesium sodium, potassium, and chlorine over a 400 foot depth of a formation output from plotter/recorder 42 (FIG. 1) is seen in FIG. 4. The representation of FIG. 4 is for illustrative purposes and is not intended to be limiting of the scope of the present invention.

There have been described and illustrated herein several embodiments of methods and apparatus using nuclear capture and inelastic spectroscopy for determining quantities of elements in a formation. While particular embodiments of the invention have been described, it is not intended that the invention be limited thereto, as it is intended that the invention be as broad in scope as the art will allow and that the specification be read likewise. Thus, while particular tools for obtaining capture and inelastic spectra have been disclosed, it will be appreciated that other tools could be used as well. In addition, while the determination of carbon weight fraction has been described using specific capture closure models, it will be appreciated that the weight fraction of other elements can be found, and that other capture closure models can be utilized. It will therefore be appreciated by those skilled in the art that yet other modifications could be made to the provided invention without deviating from its spirit and scope as claimed.

What is claimed is:

1. A method of determining an indication of a quantity of a first chemical element in a formation traversed by a borehole, the method comprising:
   a) obtaining an inelastic spectrum yield of said first chemical element;
   b) obtaining an inelastic spectrum yield and a capture spectrum yield of a second chemical element different from said first chemical element;
   c) obtaining capture spectrum yields of a plurality of other chemical elements different from said first chemical element and said second chemical element; and
   d) using said inelastic spectrum yield of said first chemical element, said inelastic spectrum yield and said capture spectrum yield of said second chemical element, and respective measurement sensitivities associated with said inelastic spectrum yield of said first chemical element, said inelastic spectrum yield of said second chemical element and said capture spectrum yield of said second chemical element, finding said quantity of said first chemical element by assigning at least one association factor for said first chemical element and incorporating said first chemical element with said association factor in a closure model which also incorporates said plurality of other chemical elements and association factors therefor to generate a weight fraction for said element.

2. A method according to claim 1, wherein:
said first chemical element is at least one of carbon and magnesium.

3. A method according to claim 2, wherein:
said second chemical element is at least one of silicon, calcium, and sulfur.

4. A method according to claim 1, wherein:
said finding comprises generating a capture yield for said first element according to $Y_{CE}/S_{CE} = (Y_{IE}/S_{IE}) \times (S_{IZ}/Y_{IZ}) \times (Y_{CZ}/S_{CZ})$, where Y is a yield, S is a sensitivity, the first subscript I or C denotes inelastic or capture values respectively, and the second subscript E or Z denotes said first element and said second element respectively.

5. A method according to claim 4, wherein:
said first element is carbon.

6. A method according to claim 5, wherein:
said finding comprises assigning at least one association factor for said carbon and incorporating said carbon with said association factor in a closure model to generate a weight fraction for said carbon.

7. A method according to claim 6, further comprising:
associating said carbon with at least one of $CO_2$ and $CO_3$ for inclusion in said closure model.

8. A method according to claim 7, further comprising:
estimating an indication of organic carbon in said formation by finding a weight fraction of inorganic carbon and subtracting said weight fraction of inorganic carbon from said weight fraction for said carbon to generate said indication of organic carbon.

9. A method according to claim 8, further comprising:
iteratively modifying said associating said carbon to associate said carbon with organic carbon compounds as well as at least one of $CO_2$ and $CO_3$ for inclusion in said closure model and reestimating said indication of organic carbon.

10. An apparatus of determining an indication of a quantity of a first chemical element in a formation traversed by a borehole, comprising:
   a) a spectroscopy tool having at least one neutron source and at least one gamma ray sensor, at least one of said gamma ray sensor sensing gamma rays resulting from inelastic scatter of neutrons in the formation and at least one of said gamma ray sensor sensing gamma rays resulting from capture of neutrons by elements in the formation; and
   b) a processing element coupled to said spectroscopy tool for finding a quantity of a first chemical element in said formation by finding an inelastic spectrum yield of said first chemical element, an inelastic spectrum yield of a second chemical element different than said first chemical element, a capture spectrum yield of said second chemical element, capture yields of a plurality of other chemical elements different from said first chemical element and said second chemical element, and using said inelastic spectrum yield of said first chemical element, said inelastic spectrum yield of said second chemical element, and said capture spectrum yield of said second chemical element along with respective measurement sensitivities associated with said inelastic spectrum yield of said first chemical element, said inelastic spectrum yield of said second chemical element and said capture spectrum yield of said second chemical element to find said quantity of said first chemical element by assigning at least one association factor for said first chemical element and incorporating said first chemical element with said association factor in a closure model which also incorporates said plurality of other chemical elements and association factors therefor to generate a weight fraction for said element.

11. An apparatus according to claim 10, wherein:
said first chemical element is at least one of carbon and magnesium.

12. An apparatus according to claim 11, wherein:
said second chemical element is at least one of silicon, calcium, and sulfur.

13. An apparatus according to claim 10, wherein:
said processing element finds said quantity by generating a capture yield for said first element according to $Y_{CE}/S_{CE} = (Y_{IE}/S_{IE}) \times (S_{IZ}/Y_{IZ}) \times (Y_{CZ}/S_{CZ})$, where Y is a yield, S is a sensitivity, the first subscript I or C denotes inelastic or capture values respectively, and the second subscript E or Z denotes said first element and said second element respectively.

14. An apparatus according to claim 13, wherein:
said first element is carbon.

15. An apparatus according to claim 14, wherein:
said processing element finds said quantity by assigning at least one association factor for said carbon and incorporating said carbon with said association factor in a closure model to generate a weight fraction for said carbon.

16. An apparatus according to claim 15, wherein:
said processing element associates said carbon with at least one of $CO_2$ and $CO_3$ for inclusion in said closure model.

17. An apparatus according to claim 16, wherein:
said processing element estimates an indication of organic carbon in said formation by finding a weight fraction of inorganic carbon and subtracting said weight fraction of inorganic carbon from said weight fraction for said carbon to generate said indication of organic carbon.

18. An apparatus according to claim 17, wherein:
said processing element reestimates said indication of organic carbon by iteratively modifying the association of carbon to include association of said carbon with organic carbon compounds as well as at least one of $CO_2$ and $CO_3$ for inclusion in said closure model.

19. A method of determining an indication of a quantity of a first chemical element in a formation traversed by a borehole, the method comprising:
   a) using capture spectrum measurements in a closure model to provide an indication of the amount of a second chemical element different from said first chemical element in the formation;
   b) obtaining an inelastic spectrum yield of said first and second chemical elements; and
   c) using said amount of said second chemical element, said inelastic spectrum yields of said first and second chemical elements and respective measurement sensitivities associated with said inelastic spectrum yields of said first and second chemical elements, finding said quantity of said first chemical element.

20. A method according to claim 19, wherein:
said finding comprises calculating an elemental concentration for said first chemical element according to $W_E = W_Z(Y_{IE}/S_{IE}) \times (S_{IZ}/Y_{IZ})$ where W is an elemental concentration, Y is a yield, S is a sensitivity, the subscript I denotes inelastic values, and the subscript E or Z denotes said first element and said second element respectively.

21. A method according to claim 20, wherein:
said first element is one of carbon and magnesium, and said second element is one of silicon, calcium, and sulfur.

22. A method according to claim 20, wherein:
said first element is carbon and said second element is silicon.

23. A method according to claim 20, wherein:
said closure model is $$\sum_j X_j W_j + F\left\{\sum_i X_i(Y_i/S_i)\right\} = 1$$

where W is the weight fraction of element j, where X is a factor that converts elements i or j to their oxide or most common association, Y is the relative yield of the element derived from the capture spectrum, S is a pre-determined measurement sensitivity that depends on the capture cross section of the specific element and the measurement tool, and F is a conversion factor fraction value.

24. A method according to claim 23, wherein:
said weight fraction of an element is computed according to $W_i=F(Y_i/S_i)$.

25. A method according to claim 20, wherein:
said closure model is $$F\left\{\sum_i X_i(Y_i/S_i)\right\} = 1$$

where X is a factor that converts an element i to its oxide or most common association, W is a weight fraction of the element in the formation, Y is the relative yield of the element derived from the capture spectrum, S is a pre-determined measurement sensitivity that depends on the capture cross section of the specific element and the measurement tool, and F is a conversion factor fraction value.

26. An apparatus of determining an indication of a quantity of a first chemical element in a formation traversed by a borehole, comprising:
a) a spectroscopy tool having at least one neutron source and at least one gamma ray sensor, at least one of said gamma ray sensor sensing gamma rays resulting from inelastic scatter of neutrons in the formation and said at least one gamma ray sensor sensing gamma rays resulting from capture of neutrons by elements in the formation; and
b) a processing element coupled to said spectroscopy tool for finding a quantity of a first chemical element in said formation by using capture spectrum measurements of said gamma ray sensor in a closure model to provide an indication of the amount of a second chemical element different from said first chemical element in the formation, using inelastic spectrum measurements of said at least one gamma ray sensor to obtain inelastic spectrum yields of said first and second chemical elements, and using said amount of said second chemical element, said inelastic spectrum yields of said first and second chemical elements and respective measurement sensitivities associated with said inelastic spectrum yields of said first and second chemical elements, finding said quantity of said first chemical element.

27. An apparatus according to claim 26, wherein:
said processing element finds said elemental concentration for said first chemical element according to $W_E=W_Z(Y_{IE}/S_{IE})\times(S_{IZ}/Y_{IZ})$ where W is an elemental concentration, Y is a yield, S is a sensitivity, the subscript I denotes inelastic values, and the subscript E or Z denotes said first element and said second element respectively.

28. An apparatus according to claim 27, wherein:
said first element is one of carbon and magnesium, and said second element is one of silicon, calcium, and sulfur.

29. An apparatus according to claim 27, wherein:
said first element is carbon and said second element is silicon.

30. An apparatus according to claim 27, wherein:
said closure model is $$\sum_j X_j W_j + F\left\{\sum_i X_i(Y_i/S_i)\right\} = 1$$

where W is the weight fraction of element j, where X is a factor that converts elements i or j to their oxide or most common association, Y is the relative yield of the element derived from the capture spectrum, S is a pre-determined measurement sensitivity that depends on the capture cross section of the specific element and the measurement tool, and F is a conversion factor fraction value.

31. An apparatus according to claim 30, wherein:
said weight fraction of an element is computed according to $W_i=F(Y_i/S_i)$.

32. An apparatus according to claim 27, wherein:
said closure model is $$F\left\{\sum_i X_i(Y_i/S_i)\right\} = 1$$

where X is a factor that converts an element i to its oxide or most common association, W is a weight fraction of the element in the formation, Y is the relative yield of the element derived from the capture spectrum, S is a pre-determined measurement sensitivity that depends on the capture cross section of the specific element and the measurement tool, and F is a conversion factor fraction value.

* * * * *